Feb. 21, 1950  H. F. HOBBS  2,498,123
LUBRICATED FRICTION CLUTCH
Filed June 27, 1945  4 Sheets-Sheet 1

Inventor,
H. F. Hobbs
By Young, Emery & Thompson
Attys.

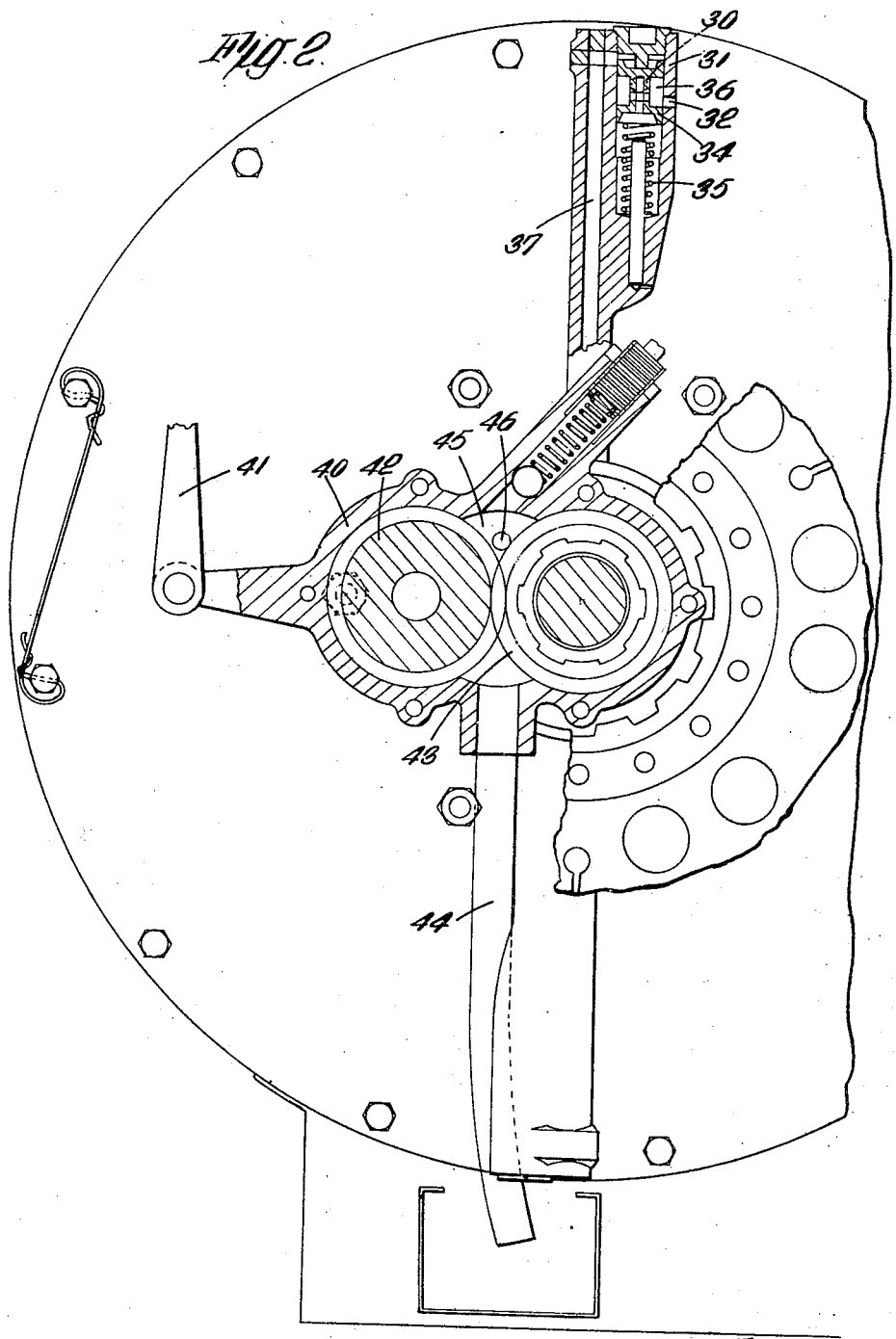

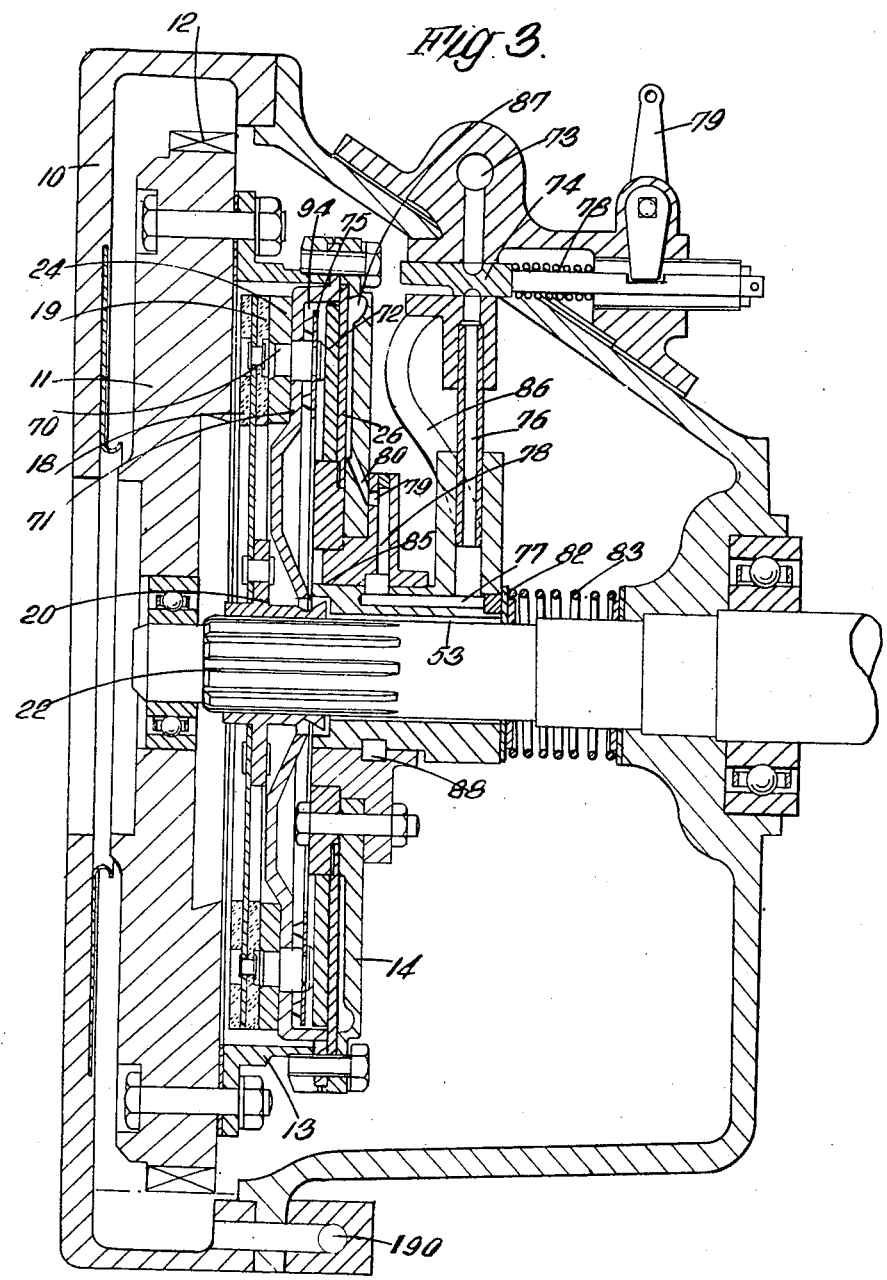

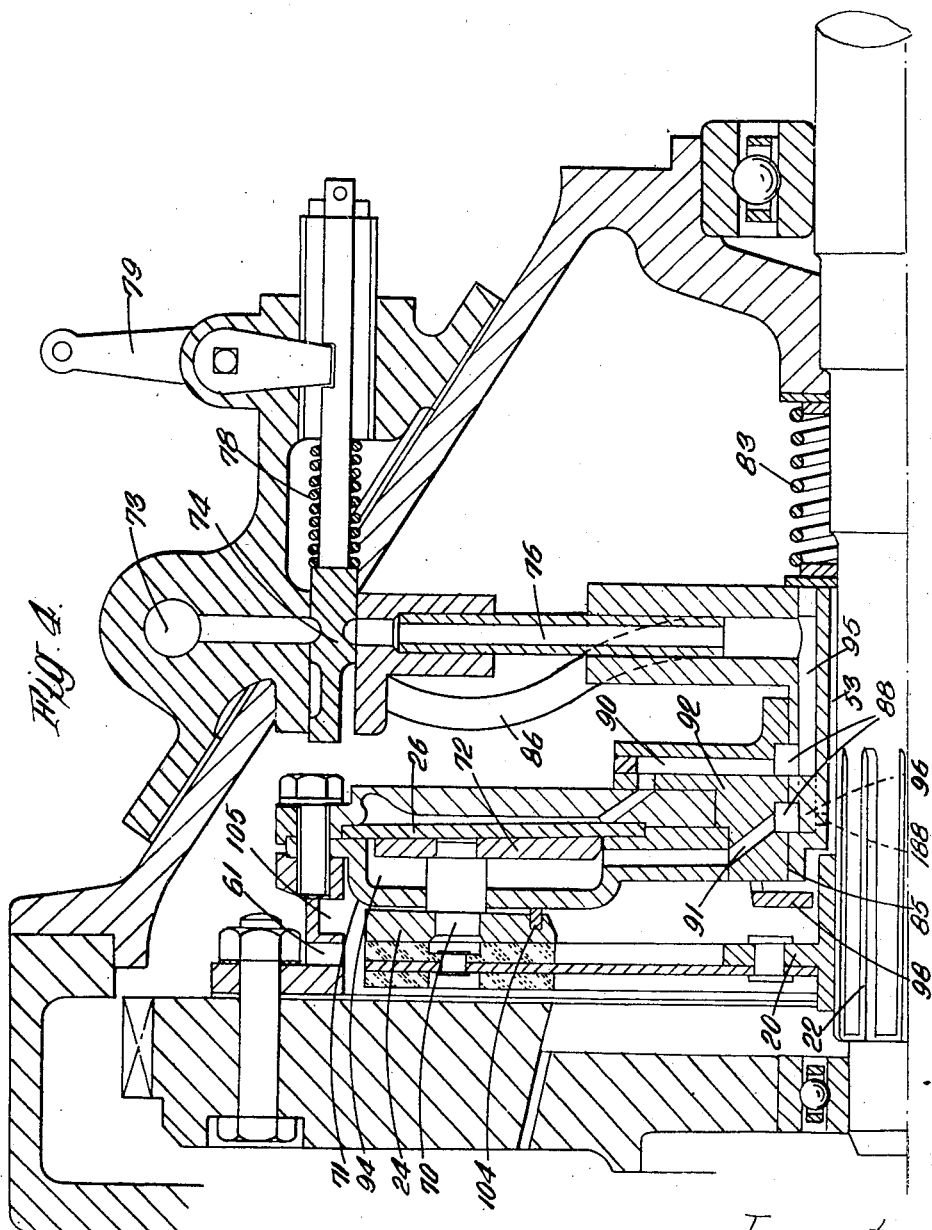

Patented Feb. 21, 1950

2,498,123

UNITED STATES PATENT OFFICE 2,498,123

LUBRICATED FRICTION CLUTCH

Howard Frederick Hobbs, Leamington Spa., England, assignor, by direct and mesne assignments, to Hobbs Transmission Limited, Leamington Spa, England, a British company Application June 27, 1945, Serial No. 601,809
In Great Britain July 20, 1944

14 Claims. (Cl. 192—113)

This invention relates to friction clutches for power transmission.

Friction clutches of the plate type have heretofore been proposed in which the friction surfaces operate in dry condition and it has also been suggested to provide shields to prevent lubricant from reaching these surfaces. Other friction clutches have been proposed in which the friction surfaces are designed to operate when covered with oil.

The "fluid flywheel" or hydraulic coupling is smooth and automatic in action but suffers from some slip and loss of efficiency at all speeds, and the great disadvantage of inability to be disengaged at will.

I have now ascertained that a very smooth engaging action and extremely low rate of wear can be obtained by supplying a definite but limited quantity of oil to continuous and smoothly-surfaced friction surfaces which are engaged under hydraulically applied pressure so as to remove sufficient oil from the surfaces during take up of the clutch surfaces to appreciably increase the coefficient of friction and cause engagement.

According to the present invention the clutch comprises cooperating relatively rotary friction plates made so that oil can escape from between them as they are pressed together, means for supplying oil by pressure to the friction surfaces in a direction to reach the parts of smaller diameter first and in sufficient quantity when the friction plates are declutched to coat the friction surfaces rapidly provision being made to reduce the supply of oil reaching the friction surfaces during engagement, an oil escape path preventing an accumulation of a bulk of oil adjacent to the inside edges of the friction surfaces, whereby a definite and considerable supply of oil reaches said surfaces whilst they are disengaged, and at most a small supply during engagement, and hydraulic means including a pump for pressing said surfaces into contact with a force high enough and applied at such a rate that said surfaces first rotate relatively whilst under the engaging pressure and finally transmit the power without relative rotation, free escape being provided for oil at the outer peripheries of the friction surfaces.

The complete clutch assembly may comprise one or more friction plates surrounding and fixed on a shaft, one or more friction plates cooperating therewith, said plates and members having substantially continuous smooth surfaces, made so that parts of greatest diameter do not contact before the parts of small diameter, and an oil supply opening between the friction surfaces and the shaft through which the oil is supplied under pressure. Each friction surface may be free from inserts e. g., it may comprise a continuous smooth surface of the same material.

The material of said surfaces may be a bonded asbestos type such as is known by the trade mark "Ferodo" and the engaging pressure may be such that the unit pressure is of the order of 40–60 lbs./sq. in. or higher.

The friction surfaces are accurately shaped to ensure that parts of greatest diameter do not contact before the parts of smallest diameter so that oil cannot be continuously fed to and contained on the surfaces of smaller diameter. For this purpose the surfaces may be exactly parallel or may be made at a very slight angle to each other so that the parts of smaller diameter contact first thereby shutting off entry of oil between the surfaces. The oil supply may only be opened on disengagement of the clutch.

The oil on the friction faces produces very smooth engagement and almost eliminates wear but unless means are provided to limit the quantity of oil reaching the friction faces during engagement to a very small amount if any, the coefficient of friction remains very low particularly when there is high relative speed between the friction surfaces. In accordance with the invention therefore ample oil is supplied to the friction surfaces while they are disengaged to ensure smooth operation on engagement, means being provided to reduce the amount of oil supplied to said surfaces during take up engagement, and hydraulic means operating at relatively low unit pressure sufficient to operate with the low coefficient existing during take up even with the limited supply of oil.

Such a clutch is capable of appreciable slip and where desired can be operated after the manner of a "fluid flywheel," i. e. allowed to slip below certain speeds and when transmitting some given torque. Ample oil may also be supplied when disengagement is required to enable this to be accomplished. Hydraulic pressure for engaging the clutch may be provided by an engine driven pump which can be speed responsive to the required degree. Alternatively the clutch can partly depend on pressure due to centrifugal action.

When used with a normal type gearbox it is necessary for the clutch to be capable of being freed almost instantly.

Hydraulic means for engagement may provide smooth and relatively slow build up of engageing pressure which is an advantage. This speed of build up can be readily regulated by limitation of the area of the oilways and also by means of leak or bleed holes, but special means are required for rapid disengagement.

A clutch embodying the main features of the invention can be designed to operate on relatively small oil pressures and can use, for its supply of pressure, the normal engine pump in which case an additional advantage is obtained by utilising the clutch as an oil cleaner and cooler. Because of the relatively large diameter of the rotating parts there is a considerable centrifugal separating effect on the oil passing therethrough.

The hydraulic means may comprise a flexible diaphragm or a series of pistons having their axes on a common cylinder coaxial with the axis of the clutch. The pistons or diaphragm may be balanced against pressure produced by centrifugal action. The pressure may be developed by a pump and may be controlled by a valve and if desired the pressure system may permit appreciable leak to give gradual build up of engaging force.

In order that the invention may be readily carried into effect a constructional form thereof will now be described with reference to the accompanying diagrammatic drawings wherein—

Figure 2 is a view of the clutch the upper part of this view being a section on a plane indicated by the arrow 2 on Figure 1;

Figure 3 is a view similar to Figure 1 showing a modified construction;

Figure 4 is a half section similar to Figure 1 but illustrating another modification.

Figure 1:
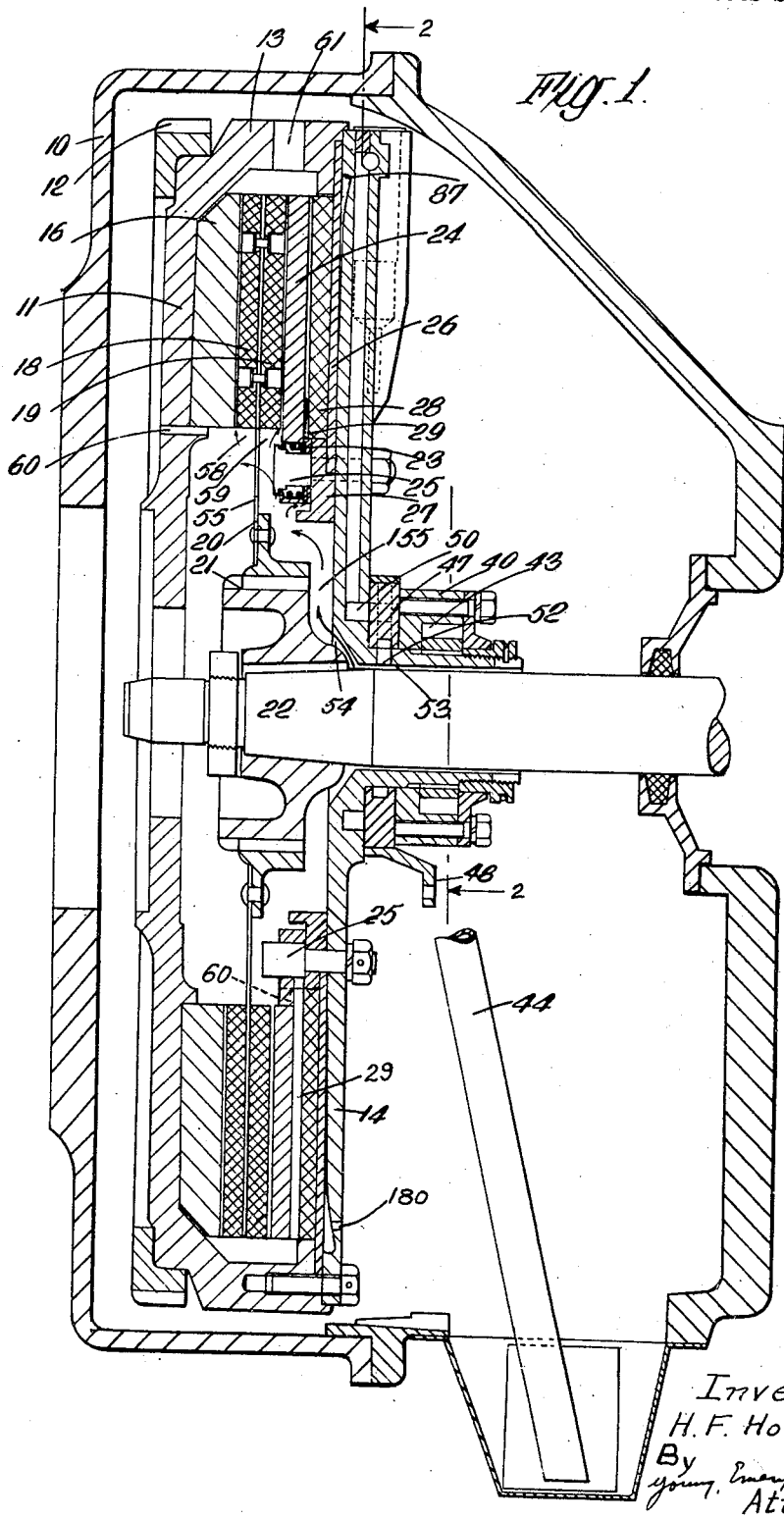
Figure 1 is a sectional view of a clutch assembly made in accordance with the present invention, the section being parallel with the axis of the clutch.

Referring first to Figures 1 and 2, the normal clutch housing 10 of a motor-car contains the usual plate 11 to be attached to the engine crankshaft, and this plate carries a peripheral flange or rim 13 and a cover plate 14, the whole forming a casing around the friction plates which comprise a friction ring or disc 16 mounted on the plate 11; friction rings 18, 19, riveted on to a steel plate 20 carried by a hub member 21 that is splined on to the gearbox shaft 22; and a friction ring or pressure plate 24 mounted in an axially slidable manner on pins 25 carried by the plate 14. Springs 23 on some of these pins serve for pressing the ring 24 in the disengaging direction. The action of these springs is preferably great enough to disengage the clutch against the action of centrifugal force on the oil at idling speeds or thereabouts.

For applying pressure to the friction ring 24 to press it towards the other friction rings for engaging the clutch, there is provided a flexible diaphragm comprising a ring 26 which may be made of fabric and a synthetic rubberlike substance. This flexible diaphragm is clamped at its inner and outer margins against the plate 14, the inner margin being clamped by a clamping ring 27. A ring 28 of a material of low heat conductance (e. g. resin-impregnated fabric) is mounted in an axially movable manner on the clamp ring 27 and has slots 29 cut across one face so that oil can pass through the slots for the purpose of escape and cooling.

Oil under pressure can be supplied to the space on one side of the diaphragm (between it and the plate 14) through an opening 30 which is disposed at the outer part of said space and communicates with the interior of a valve chamber 31 that has an oil escape opening 32 closely adjacent to the opening 30. The valve chamber contains a movable valve member 34 pressed by a spring 35 outwardly. In the outward position of the valve member a channel 36 therein provides communication between the openings 30 and 32 so that oil can rapidly escape from behind the diaphragm aided by centrifugal force on the oil when the clutch is to be disengaged. Fluid under pressure can be supplied from a pump through a conduit 37 to the valve chamber 31 above the valve member. The centrifugal force on the oil in the conduit 37 balances the centrifugal force on the valve member 34 but the additional pump pressure (when applied) moves the valve member inwards to close the communication between 30 and 32 and to provide communication between the channel 37 and the opening 30 whereby the oil pressure is introduced behind the diaphragm to engage the clutch.

The pump for supplying the oil under pressure comprises a pump housing 40 surrounding the shaft 22 and anchored by means of a lever 41 to a suitable rigid part, and gear wheels 42, 43. The intake to the pump is by pipe 44 and the outlet or delivery side 45 of the pump is connected by a port 46 to a valve plate 47 that surrounds the shaft 22 between the plate 14 and the pump housing 40 and is rotatable for valve control by an arm 48 connected to a suitable pedal (not shown). This valve plate has appropriate drillings whereby in one position of the valve plate the oil delivered by the pump passes to the conduit 37 through a channel 50, and when the valve is moved to another position this oil delivery to the channel 50 is closed and the oil delivery is then ported to a channel 52 through which the oil is delivered through openings 53, 54, to the interior 155 of the casing 11, 13, 14. The conduit or opening 54 is disposed between the friction surfaces and the axis of the clutch so that oil leaves the opening 54 and is thrown or sprayed out (aided by centrifugal action) in the direction to reach the parts of smaller diameter of the friction rings first. The oil passes outwards and some of it passes through holes 55 in the plate 20 so that the oil reaches the two sets of friction surfaces and will pass outwardly between the friction rings 16, 18, and 24, 19, thereby coating the friction surfaces. If a bulk of oil were to collect against the inner margins of the friction rings (i. e. at 58, 59) it would be fed to the friction surfaces at a time when the oil is to be pressed off the surfaces for effecting engagement, and to avoid such accumulation of oil a suitable oil escape path is provided comprising channels 60. Free escape is provided for oil leaving the peripheries of the friction surfaces by forming openings 61 in the rim 13 so that oil will not accumulate in the casing 11, 13, 14.

The pump supplies oil at a sufficient rate and pressure to cause the oil on the friction surfaces to be substantially removed after pressing together for the required time whereby a smooth take up of power transmission is provided and the friction surfaces will then engage and transmit full engine torque without slip.

Sufficient oil is to be supplied to coat the friction surfaces very rapidly (e. g. in a period of a second or so) on disengaging the clutch, and for this purpose it is necessary to provide pressure supply of oil and free passageway to the friction surfaces. The supply of oil to the friction surfaces must not however be too great in relation to the clutch engaging pressure.

In the arrangement shown in Figure 3 the friction ring 24 is fixed on pins 70 which are slidably mounted in an annular plate or ring 71 that is bolted between the parts 13 and 14. Pressure is imparted to these pins for engaging the clutch by the diaphragm 26 through a movable ring 72. Fluid under pressure is fed from an engine driven pump to the duct 73 and passes through ports in a valve member 74 in one position thereof to a pipe 76, and thence through ducts 77, 78, port 79, and channel 80, to the space behind the diaphragm 26. The valve member 74 is operated by spring 78 and lever 79 connected to a suitable pedal not shown. A plate spring 75 carried by the pins 70 acts against the ring 71 to return the pins to the clutch disengaging positions on release of the fluid pressure. The action of this spring is preferably great enough to disengage the clutch against the action of centrifugal force on the oil at idling speeds or thereabouts. In another position of the valve member the fluid supply from 73 to 76 is stopped and the fluid then passes through another port in the valve member and pipe 86, to the aforesaid opening 53 and thence to the friction surfaces. A disc 82 pressed by a light spring 83 ensures passage of oil forwards. At the position 85 oil leak might occur and cause too much oil to reach the friction surfaces during the engaged periods, but this oil is prevented from reaching said surfaces in unduly large quantities by extending the plate 71 inwardly beyond the position 85.

In the arrangements of Figures 1 and 2 as well as that of Figure 3 leak of oil from the pump output during engagement of the clutch is shielded from directly reaching the friction surfaces. Escape holes may be provided to enable oil leakage to escape instead of being directed to the friction surfaces.

Leakage of oil over the surfaces of the pins 70 during clutch take-up and engagement may exceed leakage at the position 85 to avoid feeding oil to the clutch plates during take-up and engagement.

A groove 87 may be provided behind the diaphragm to trap sludge. The parts between which the outer margin of the diaphragm is clamped must be dimensioned so that the clamping surface on the pressure side does not extend further inwards than the clamping surface on the opposite side otherwise sludge may pack behind the outer parts of the diaphragm and tend to hold the clutch engaged after release of fluid pressure.

The annular plate 71 provides a pocket 94 in which oil will be held so that the centrifugal force on the oil on the one side of the diaphragm acting in the direction to apply the clutch will be balanced by the centrifugal force on the oil on the other side of the diaphragm which acts in the direction to relieve pressure on the clutch and to collapse the diaphragm for disengaging the clutch.

If leakage prevents complete balancing the additional oil for balancing will be provided through the channel 53 when clutch disengagement is required. Space in the balancing pockets should be as small as possible. The pocket may extend inwards sufficiently so that a greater disengaging centrifugal pressure is exerted therein than that acting to engage the clutch.

If desired the plate 71 (as shown in Figure 4) may be sealed at its inner edge by a sealing ring 92 having an oilway 90 communicating with the space behind the diaphragm and an oilway 91 communicating with the pocket 94. Oil from the pump is fed by the valve through a duct 95 to the space behind the diaphragm during engagement of the clutch but is diverted and passes through a duct 96 to the pocket 94 to build up a pressure to ensure quick collapse of the diaphragm for quick disengagement of the clutch. In this case leak at 85 is shielded by a shield ring 98 and led to escape holes. In this case duct 96 fed by the pipe 86 has a small hole 188 provided which permits sufficient leak when the pocket is under pressure to provide the oil for the disengaged friction surfaces. Incidentally, in the arrangement shown in Fig. 4 the pins 70 are fixed to the plate 72 and transmit movement for disengaging the clutch as well as for engaging the clutch as in Fig. 3.

Instead of providing a valve such as 34 (Figure 2) to drain the oil from the diaphragm or a pocket as formed by plate 71 (Figure 3) to balance the centrifugal pressure from the oil behind the diaphragm, and when it is unnecessary for very rapid disengagement of the clutch, a leak or bleed hole may be provided such as shown at the position 188 (Figure 1). This will be of suitable size to drain the clutch e. g. $3/64''$ diameter, but not large enough to leak at a rate which cannot easily be overcome by the pump during engagement. A plate such as 71 may be employed but extending inwards for example only as far as the diaphragm and a bleed hole may be provided and situated at a point on about this diameter i. e., the pocket formed will only partially balance the centrifugal pressure behind the diaphragm until oil such as in the oil ducts is leaked away. If leak holes are provided to enable oil to leave the space behind the diaphragm, these holes will be provided nearer to the axis of the clutch than the sludge groove. The holes will preferably be about the same distance from the axis as the outer margin of the non-clamped part of the diaphragm.

When bleed holes are provided for completely draining a diaphragm or for draining away oil in feed holes (in which case release springs may overcome the out of balance at least at idling) care must be taken to provide sufficient feed to easily overcome bleed without large fall in pressure as may result if the feed at 88 is not arranged internally and ample so that oil can be accelerated and taken up without too great pressure loss.

The leak opening at the position 30 may be variable and controlled by valves e. g. a spring pressed ball in a valve chamber which may be conical in one or both directions to increase or reduce the leak as may be required with increase of rotary speed, and/or oil pressure.

In a modification the engaging pressure is provided mainly by the centrifugal force on the oil in the space behind the diaphragm or pistons. The supply of oil to the diaphragm and to the friction surfaces may be effected partly by centrifugal force but some type of pressure pump will be required.

The pump may be driven by the engine and another pump may be provided to pump oil from the clutch housing or pump to the engine, the latter pump being if desired in the form of teeth on the member 12 which teeth may also serve as a starter ring, or a similar disc so arranged as to raise the oil to the required level.

The pressure required to engage the friction surfaces may be considerably greater than the force to maintain the engagement. The engaging pressure should be sufficient to overcome the torque with the coefficient of friction existing during slip, which coefficient may be very much smaller than when oil is removed from the friction surfaces. The engaging pressure should be great enough to cause the friction surfaces to engage without slip whilst some oil is still present on the said surfaces.

If desired the ring 24 may have an oil opening level with the inner edges of the friction surfaces, or both rings 16 or 24 may be cut back adjacent to these edges so that the input friction surfaces do not extend as a continuous ring further inwards than the rotary friction surfaces for this tends to collect and feed oil when not required.

The pressure ring 24 may be provided with a sealing ring or beading 104 or otherwise adapted to seal against the member 71 in the disengaging position whereby oil will be trapped and diverted to the friction surfaces, and adapted to allow oil to pass between it and the member 71 (viz: on the side of the ring 24 opposite to its friction surface side) in the engaging position. The ring 24 may be similarly arranged with respect to the cover plate 14 or the clamping ring 27.

With clutch units comprising two or more clutches there may be longer periods of disengagement, i. e., one clutch being used and then another, and it is therefore possible to use a continuous but limited feed of oil or a sealing ring may be provided as described above.

A pocket such as that formed by plate 71 acts as a powerful oil cleaner as a small quantity of oil is slowly and continuously circulated through it and particles of dirt and other matter are thrown to the outside by centrifugal action.

With a bleed hole the space behind the diaphragm has a similar action and an ample sludge groove is therefore provided. The bleed hole is preferably angularly offset to the feed oil duct or ducts so as to cause circulation around the diaphragm space.

Similarly with a valve such as 34 sludge grooves are provided and if desired larger space than that shown above the valve 34 may be provided in the form of a cavity with a cover plate and particularly if used with a pump common both to clutch and engine.

The space formed within the rim 13 may be provided with a sludge groove (105 Figure 4) in such a position that the oil will pass over the groove before reaching holes 61. If desired the plate 24 can be provided with a ring or beading as above described and oil circulated continuously for the purpose of cooling and cleaning.

If desired the clutch may contain a quantity of oil which can be moved from one space where it effects engagement of the clutch to another space where it effects balancing without passing through an oil reservoir.

The numeral 190 in Fig. 3 indicates a conduit for connection to a pump for scavenging.

I claim:

1. A clutch comprising co-operating relatively rotary friction input and output plates connected to input and output members respectively and made so that oil can escape from between them as they are pressed together, means for supplying oil or the like liquid by pressure to the friction surfaces of said plates in a direction to reach the inner periphery of said plates first and in sufficient quantity when all the friction plates connected to all said members are de-clutched and all the input plates are rotating relatively to the output plates, to lubricate the friction surfaces without flooding the spaces between adjacent friction surfaces, means providing free escape for oil at the outer peripheries of the friction surfaces, means to reduce the supply of oil reaching the friction surfaces during take up and engagement to from nil up to at most a rate less than the rate supplied while said members are declutched, an oil escape path large enough in relation to the rate of oil supply so as at all times to prevent an accumulation of a bulk of oil adjacent to the inside edges of the friction surfaces, and hydraulic means including a flexible diaphragm concentric with the clutch axis for pressing said surfaces into contact with a force high enough and applied at such a rate that said surfaces first rotate relatively while under the engaging load and finally transmit the power without relative rotation, said diaphragm being held at its inner and outer edges whereby the oil acting on the diaphragm cannot leak onto the friction surfaces.

2. A clutch as claimed in claim 1 having a flexible diaphragm ring for applying the required pressure to the friction surfaces, a space on one side of the diaphragm to receive fluid producing said pressure, a bleed hole communicating with the said space at about the same distance from the axis of the clutch as the outer margin of the movable part of the diaphragm, and a sludge groove communicating with said space at a greater distance from said axis than the said hole.

3. A clutch as claimed in claim 1 having spring means for clutch disengagement at least strong enough to overcome the centrifugal pressure of the oil at idling speeds.

4. A clutch as claimed in claim 1 wherein oil is supplied to a space on one side of at least one movable member through which engaging pressure is applied to the friction surfaces, said pressure being mainly produced by the centrifugal force on the oil.

5. A clutch as claimed in claim 1 wherein pressure due to centrifugal force on liquid used for engaging the clutch is balanced at least during disengagement.

6. A clutch as claimed in claim 1 having a part which acts as a shield to substantially prevent oil leak during clutch engagement from reaching the friction surfaces.

7. A clutch as claimed in claim 1 wherein fixed friction clutch members are arranged so that liquid passes on the side opposite to the friction surface side in its engaging position but this escape for the liquid is closed in its disengaging position and thereby diverted to the friction surfaces.

8. A clutch as claimed in claim 1 wherein oil is continuously or intermittently circulated within a rotary part, provided with a sludge groove whereby the oil is cleaned.

9. A clutch as claimed in claim 1 having a flexible diaphragm of fabric and synthetic rubber-like substance wherein means are provided to prevent direct contact of the diaphragm and the pressure friction plate of the clutch.

10. A clutch as claimed in claim 1 wherein there is provided between the diaphragm and the friction plates a disc of non-metallic heat insulating material, and grooves are provided between the disc and the plates extending from the inner edge of the disc to its outer edge.

11. A clutch as claimed in claim 1 wherein the complete clutch assembly comprises at least one friction plate surrounding and fixed on a shaft, at least one friction plate co-operating therewith, said plates and members having substantially continuous smooth surfaces made so that parts of greatest diameter do not contact before the parts of smallest diameter, and an oil supply opening between the friction surfaces and the shaft through which the oil is supplied under pressure.

12. A clutch as claimed in claim 1 wherein movement of a plate causes diversion of the oil to the friction surfaces when in the disengaged position, and allows oil to escape without flowing to the friction surfaces when in the engaged position.

13. A clutch as claimed in claim 1, said means to reduce the supply of oil including a valve movable to a position where the pump output pressure is directed to apply pressure for engaging the clutch and cutting off the supply to the friction surfaces and movable to another position in which the output pressure is cut off from engaging the clutch and opened to supply oil to the friction surfaces.

14. A clutch as claimed in claim 1 wherein fluid is supplied to a space behind the flexible diaphragm through which engaging pressure is applied to the friction surfaces and an oil escape channel connects with the outer part of said space and leads to a closely adjacent escape opening.

HOWARD FREDERICK HOBBS.

REFERENCES CITED

The following references are of record in the file of this patent:

UNITED STATES PATENTS

| Number | Name | Date |
| --- | --- | --- |
| 987,954 | Brush | Mar. 28, 1911 |
| 1,189,176 | Price | June 27, 1916 |
| 1,928,301 | Pierson | Sept. 26, 1933 |
| 2,158,440 | Spase | May 16, 1939 |
| 2,258,463 | Moncrieff | Oct. 7, 1941 |
| 2,290,542 | Criley | July 21, 1942 |
| 2,437,670 | Adamson | Mar. 16, 1948 |

FOREIGN PATENTS

| Number | Country | Date |
| --- | --- | --- |
| 232,144 | Germany | Mar. 7, 1911 |
| 579,061 | Germany | June 21, 1933 |